(12) United States Patent
Kamalov et al.

(10) Patent No.: US 9,893,834 B2
(45) Date of Patent: *Feb. 13, 2018

(54) LOCALLY POWERED OPTICAL COMMUNICATION NETWORK

(71) Applicant: Google Inc., Mountain View, CA (US)

(72) Inventors: Valey Kamalov, Gainesville, FL (US); Joseph Freeland, Independence, MO (US); Andrew Metcalf, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,478

(22) Filed: Dec. 14, 2016

(65) Prior Publication Data

US 2017/0093514 A1 Mar. 30, 2017

Related U.S. Application Data

(63) Continuation of application No. 14/601,558, filed on Jan. 21, 2015, now Pat. No. 9,559,776.

(51) Int. Cl.
*H04B 10/00* (2013.01)
*H04J 14/02* (2006.01)
(Continued)

(52) U.S. Cl.
CPC ...... *H04J 14/0213* (2013.01); *H04B 10/2916* (2013.01); *H04B 10/808* (2013.01)

(58) Field of Classification Search
CPC  H04B 10/2575; H04B 10/503; H04J 14/0213
See application file for complete search history.

(56) References Cited

U.S. PATENT DOCUMENTS 2,020,308 A * 11/1935 Gannett .................. H03F 1/542
                                                         178/63 D
4,881,790 A * 11/1989 Mollenauer ........ H04B 10/2916
                                                         385/15
(Continued)

FOREIGN PATENT DOCUMENTS

EP          1884044 B1     10/2010
JP       2012518340 A      8/2012
(Continued)

OTHER PUBLICATIONS

Professor Hall's Floating Stations, from Scientific American, vol. 12, Issue 23, Feb. 14, 1857.
(Continued)

*Primary Examiner* — Danny Leung
(74) *Attorney, Agent, or Firm* — Honigman Miller Schwartz and Cohn LLP

(57) ABSTRACT

A branching unit for an optical system includes an optical add-drop multiplexer, which includes first and second filters. The first filter is configured to filter a first band of wavelengths of a communication spectrum for a first communication segment. The second filter is configured to filter a second band of wavelengths of the communication spectrum for a second communication segment. The second band of wavelengths overlaps the first band of wavelengths in an overlap band of wavelengths with no guard band between the first band of wavelengths and the second band of wavelengths. Moreover, the overlap band of wavelengths has a variable size. The first band of wavelengths includes a first fraction of the overlap band of wavelengths for the first communication segment and the second band of wavelengths includes a remaining fraction of the overlap band of wavelengths for the second communication segment.

20 Claims, 11 Drawing Sheets

(51) Int. Cl.
*H04B 10/291* (2013.01)
*H04B 10/80* (2013.01)

(56) References Cited

U.S. PATENT DOCUMENTS

| | | | | |
|---|---|---|---|---|
| 5,719,693 | A * | 2/1998 | Tanoue | H04B 10/29 398/105 |
| 6,342,962 | B2 * | 1/2002 | Marcerou | H04B 10/25077 398/104 |
| 6,351,581 | B1 * | 2/2002 | Doerr | G02B 6/12021 385/24 |
| 7,068,938 | B1 * | 6/2006 | Islam | H04J 14/0213 398/82 |
| 7,254,337 | B1 * | 8/2007 | Islam | H04J 14/0206 398/83 |
| 7,899,290 | B2 * | 3/2011 | Mayer | G02B 6/4403 385/100 |
| 8,089,683 | B2 * | 1/2012 | Holmes | G02B 5/32 349/196 |
| 8,483,564 | B2 * | 7/2013 | Mu | H04J 14/0257 398/46 |
| 2003/0072062 | A1 * | 4/2003 | Pedersen | G02B 6/4428 398/181 |
| 2003/0151521 | A1 * | 8/2003 | Horinouchi | H04B 10/806 340/850 |
| 2003/0230936 | A1 * | 12/2003 | Muramatsu | H04B 3/44 307/69 |
| 2006/0251423 | A1 * | 11/2006 | Evangelides, Jr. | H04B 10/07955 398/105 |
| 2010/0008672 | A1 * | 1/2010 | Kovsh | H04J 14/0204 398/85 |
| 2011/0058814 | A1 * | 3/2011 | Camilli | H04B 10/272 398/104 |
| 2012/0170928 | A1 * | 7/2012 | Tanaka | H04B 10/2557 398/28 |
| 2012/0177362 | A1 * | 7/2012 | Zhang | H04B 10/0773 398/9 |
| 2012/0301141 | A1 * | 11/2012 | Sakamoto | H04J 14/0204 398/48 |
| 2013/0202285 | A1 * | 8/2013 | Lecroart | H04B 3/44 398/1 |
| 2013/0302028 | A1 * | 11/2013 | Barnard | H04B 10/572 398/25 |
| 2015/0043920 | A1 * | 2/2015 | Ji | H04J 14/021 398/83 |
| 2015/0132004 | A1 * | 5/2015 | Farr | H04B 13/02 398/104 |
| 2015/0200742 | A1 * | 7/2015 | Kamalov | H04J 14/021 398/85 |
| 2015/0200743 | A1 * | 7/2015 | Kamalov | H04J 14/0202 398/85 |
| 2016/0211918 | A1 * | 7/2016 | Kamalov | H04B 10/2575 |
| 2017/0093514 | A1 * | 3/2017 | Kamalov | H04J 14/0213 |

FOREIGN PATENT DOCUMENTS

WO WO-2011/031815 3/2011
WO WO-2014113422 7/2014

OTHER PUBLICATIONS

International Search Report and Written Opinion for WO Application No. PCT/US2015/062349, dated Mar. 14, 2016.

* cited by examiner

FIG. 1 - Prior Art

LOCALLY POWERED OPTICAL COMMUNICATION NETWORK

CROSS REFERENCE TO RELATED APPLICATIONS

This U.S. patent application is a continuation of, and claims priority under 35 U.S.C. § 120 from, U.S. patent application Ser. No. 14/601,558, filed on Jan. 21, 2015, which is hereby incorporated by reference in its entirety.

TECHNICAL FIELD

This disclosure relates to locally powered optical communication networks, as by using power sources along a transoceanic fiber optic cable.

BACKGROUND

Submarine optical communication cables are optical cables laid on the sea bed connecting land-based stations. The optical communication cables carry signals across the ocean allowing for cable communication over the sea between different continents. Each transoceanic submarine optical cable includes multiple (up to eight) pairs of fibers; each pair has one fiber in each direction. The submarine optical communication cable is divided into multiple sections, each section connected to the other section by a submarine repeater. As the signals are carried across the ocean, the signals may lose some of their power. Each submarine repeater comprises multiple Erbium Doped Fiber Amplifiers (EDFA), one amplifier for the signal in each direction of each fiber. Each EDFA has a gain sufficient to compensate for the loss experienced by the signal during its propagation in the previous section of fiber. A typical length of cables (i.e., fiber) section between repeaters is about 60 km. A typical Trans-Pacific cable with a length of 10,000 km has about 150-180 repeaters. Therefore, the repeaters ensure that the land-based station receiving the signal, from another land-based station, understands the signal. In other words, the repeaters increase the power of the signal to compensate for any loss during the signal propagation. The increased power translated to higher capacity because the clearer and more precise the optical signal is, the more complex signals may be sent from one land-based station to another.

Referring to FIG. 1, an optical communication system 10 includes first and second trunk terminals 110, 120 (also referred to as stations) coupled to a communication trunk 102. The communication trunk may include one or more repeaters 150. The repeaters 150 are powered by a constant current, typically 1 Ampere by power feeding equipment, e.g., power source 112 located by the shore. Due to nonzero electrical resistivity of copper, even with large copper area conductor having a resistance as low as 1 Ohm/kilometer, power feeding voltage drops by 60 Volt at each section of cable, so that about half of power feeding voltage is lost due to heat dissipation in copper for Trans-Pacific cable. In some examples, each power source 112 can provide power feed voltage of up to 15 kilovolts. Further increase of power feeding voltage to higher that 15 kV may result in a fault during cable operation, which has a lifetime of 25 years. The power feeding equipment 112 powers the repeaters 150 by a power cable 113, such as a copper cable. With half of power feeding voltage lost due to heat dissipation in copper cable, and due to large number of repeaters, 150-180, voltage drop at each repeater is limited to below 50 Volt. Typical output power launched into a submarine fiber is 17 dBm (50 mW) for each direction. Assuming highly efficient conversion from electrical into optical of 30% in diode laser and 10% efficiency of EDFA pumped by diode laser, each EDFA requires about 2 Volts power drop at constant current of 1 A. Thus 50V power feed voltage per repeater limits the number of EDFAs in the repeater to 20-25, i.e., supporting compensation of loss for not more than 10-12 fiber pairs. Most of subsea cables today have six fiber pairs. Thus, the power feeding of repeaters from the shores limits further growth of capacity of trans-oceanic submarine cables.

SUMMARY

The present disclosure addresses the limitations of conventional transoceanic fiber optic cables without the drawback of limited power and bandwidth. One mechanism for overcoming the current limitations is the use of power sources along the communication trunk that extends across an ocean.

One aspect of the disclosure provides an optical system for a locally powered optical communication network. The optical system includes a first trunk terminal emitting an optical signal, a second trunk terminal receiving the optical signal, a communication trunk, an intermediate unit and a power source. The communication trunk is disposed along a floor of a body of water and couples the first trunk terminal to the second trunk terminal. The communication trunk transmits the optical signal from the first trunk terminal to the second trunk terminal. The intermediate unit is connected to the communication trunk between the first and second trunk terminals. The intermediate unit receives the emitted optical signal from the first trunk terminal, amplifies the received optical signal and sends the amplified optical signal to the second trunk. The power source is connected to and powers the intermediate unit. The power source is located at or near a surface of the body of water.

Implementations of the disclosure may include one or more of the following optional features. In some implementations, the intermediate unit includes a laser powered by the power source and emits an optical output and an optical combiner in communication with the laser and the first and second trunk terminals. The optical combiner includes receiving the optical signal from the first trunk terminal and the optical output from the laser, amplifies the optical signal by combining the optical signal from the first trunk terminal and the optical output from the laser and outputs the amplified signal to the second trunk terminal.

In some examples, the optical combiner includes an optical amplifier, an optical combiner/splitter, or an optical add-drop multiplexer. The system may further include an optical fiber connecting the optical combiner and the laser and transmits the optical output from the laser to the optical combiner. The optical combiner may include a wavelength splitter to enable Raman Amplification in submarine fiber or an Erbium Doped Fiber Amplifier. The power source may power the laser.

The system may include an electrical power cable coupling the power source and the intermediate unit and powers the intermediate unit. The intermediate unit may include an optical communication amplifier or optical regenerator to improve quality of optical communication signal. The power source may include a wind power source, a wave power source, a solar power source, a thermoelectric power source, or a fuel power source.

In some examples, the system includes a branching unit disposed along the communication trunk and couples a branch terminal to the communication trunk. The branching unit includes an optical add-drop multiplexer including a first filter filtering a first band of wavelengths of a communication spectrum for a first communication segment and a second filter filtering a second band of wavelengths of the communication spectrum for a second communication segment. The second band of wavelengths overlap the first band of wavelengths in an overlap band of wavelengths with no guard band between the first band and the second band, the overlap band having a variable size. The first band of wavelengths may include a first fraction of the overlap band of wavelengths for the first communication segment and the second band of wavelengths includes a remaining fraction of the overlap band of wavelengths for the second communication segment.

The first band of wavelengths may include an entire overlap band of wavelengths for the first communication segment and the second band of wavelengths excludes the overlap band of wavelengths from the second communication segment. The overlap band of wavelengths may include common wavelengths between a spectral edge of the first band of wavelengths and a spectral edge of the second band of wavelengths. The first filter and/or the second filter may provide a fixed sized overlap band of wavelengths of the communication spectrum. The first filter and/or the second filter may be adjustable to provide a variable sized overlap band of wavelengths of the communication spectrum. Filtering may include adding, dropping, and/or reusing wavelengths.

Another aspect of the disclosure provides a method for a locally powered optical communication network. The method includes emitting an optical signal from a first trunk terminal into a communication trunk disposed along a floor of a body of water. The communication trunk couples the first trunk terminal to a second trunk terminal and transmits the optical signal from the first trunk terminal to the second trunk terminal. The method further includes receiving the optical signal at an intermediate unit between the first trunk terminal and the second trunk terminal. The intermediate unit is connected to the communication trunk between the first and second trunk terminals. The intermediate unit is powered by a power source located at or near a surface of the body of water. The method further includes amplifying the received optical signal at the intermediate unit and sends the amplified optical signal from the intermediate unit to the second trunk terminal.

In some implementations, amplifying the received optical signal includes combining an optical output from a laser of the intermediate unit with the received optical signal. The method may further include, at the intermediate unit, optical regeneration to improve quality of optical signal. For example, an optical regenerator may convert the received optical signal to an electrical signal, process the electrical signal, and convert the electrical signal to the amplified optical signal. The intermediate unit may further include a laser powered by the power source and emitting an optical output and an optical combiner in communication with the laser and the first and second trunk terminals. The optical combiner may include receiving the optical signal from the first trunk terminal and the optical output from the laser, amplifying the optical signal by combining the optical signal from the first trunk terminal and the optical output from the laser and outputting the amplified signal to the second trunk terminal. The power source may include one of a wave power source, a solar power source, a thermoelectric power source, or a fuel power source.

In some examples, the method includes filtering, at a branching unit in communication with the intermediate unit, a first band of wavelengths of a communication spectrum for a first communication segment and filtering, at the branching unit, a second band of wavelengths of the communication spectrum for a second communication segment. The second band of wavelengths overlap the first band of wavelengths in an overlap band of wavelengths with no guard band between the first band and the second band. The overlap band has a variable size. The first band of wavelengths may include a first fraction of the overlap band of wavelengths for the first communication segment and the second band of wavelengths includes a remaining fraction of the overlap band of wavelengths for the second communication segment. The overlap band of wavelengths may include common wavelengths between a spectral edge of the first band of wavelengths and a spectral edge of the second band of wavelengths.

Yet another aspect of the disclosure provides a second method for a locally powered optical communication network. The method includes receiving an optical signal at an intermediate unit connected to a communication trunk disposed along a floor of a body of water, the intermediate unit coupling a first trunk terminal to a second trunk terminal. The method further includes amplifying the received optical signal at the intermediate unit by injecting light into the communication trunk. The intermediate unit includes an optical combiner connected to the communication trunk and a laser in optical communication with the optical combiner and sends an optical output to the optical combiner. The method further includes powering the laser using a power source in communication with the intermediate unit and is located at or near a surface of the body of water.

In some examples, amplifying the received optical signal includes combining an optical output from the laser of the intermediate unit with the received optical signal. The method further includes, at the intermediate unit, coupling the laser pump light having a frequency different than the signal frequency so that the laser pump may amplify the signal through a process of stimulated Raman scattering. The laser may have a frequency higher than the signal frequency, enabling efficient Raman amplification. The laser may be located at or near the power source or at or near the optical combiner. The power source may include a wave power source, a solar power source, a thermoelectric power source, or a fuel power source.

In some implementations, the method includes filtering, at a branching unit in communication with the intermediate unit, a first band of wavelengths of a communication spectrum for a first communication segment and filtering, at the branching unit, a second band of wavelengths of the communication spectrum for a second communication segment. The second band of wavelengths overlap the first band of wavelengths in an overlap band of wavelengths with no guard band between the first band and the second band, the overlap band having a variable size. The first band of wavelengths includes a first fraction of the overlap band of wavelengths for the first communication segment and the second band of wavelengths includes a remaining fraction of the overlap band of wavelengths for the second communication segment. The overlap band of wavelengths includes common wavelengths between a spectral edge of the first band of wavelengths and a spectral edge of the second band of wavelengths. The optical combiner may include a Raman Amplifier or a high power Erbium Doped Fiber Amplifier.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 2:
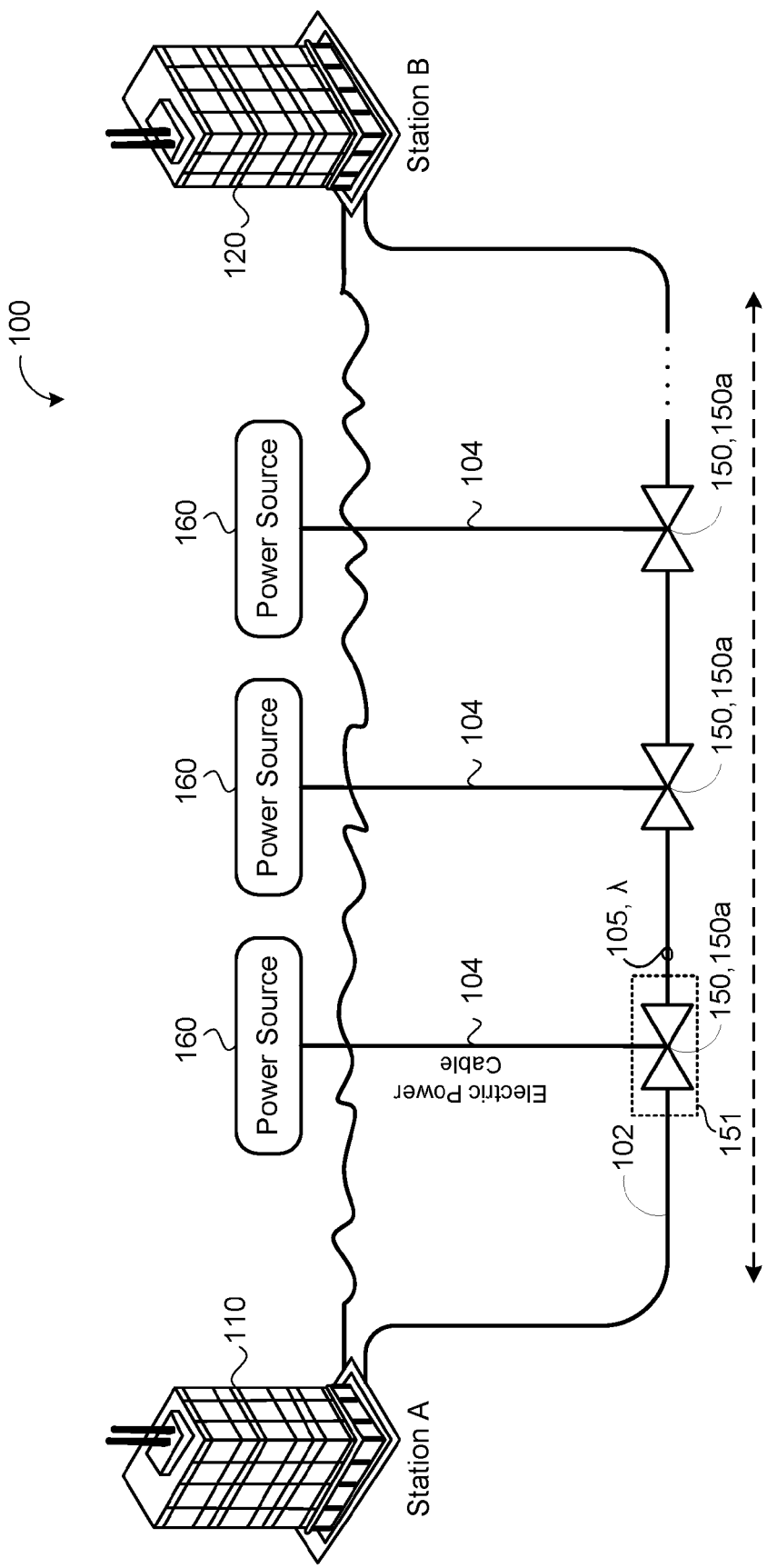
FIGS. 2 and 3 are a schematic view of an exemplary optical communication system having power sources at or near the ocean surface along the communication trunk.

Referring to FIG. 2, an optical communication system 100 includes first and second trunk terminals 110, 120 (also referred to as stations) coupled to a communication trunk 102. The coupling may be any connection, link or the like by which signals carried by one system element are imparted to the "coupled" element. The coupled elements may not necessarily be directly connected to one another and may be separated by intermediate components or devices that may manipulate or modify the signals. The communication trunk 102 may include a plurality of optical cable segments 102, 102a-n (e.g., optical submarine cables) that carry optical signals 105 on associated optical channels/wavelengths λ.

Each cable segment 102 may include one or more sections of fiber optic cable including optical fiber pairs and one or more repeaters 150 to provide a transmission path for bi-directional communication of optical signals 105 between the first and second trunk terminals 110, 120. The system 100 may be configured as a long-haul system, e.g., having a length between at least two of the terminals 110, 120 of more than about 600 km, and may span a body of water, e.g., an ocean and having a length of 6,000-12,000 km.

Figure 1:
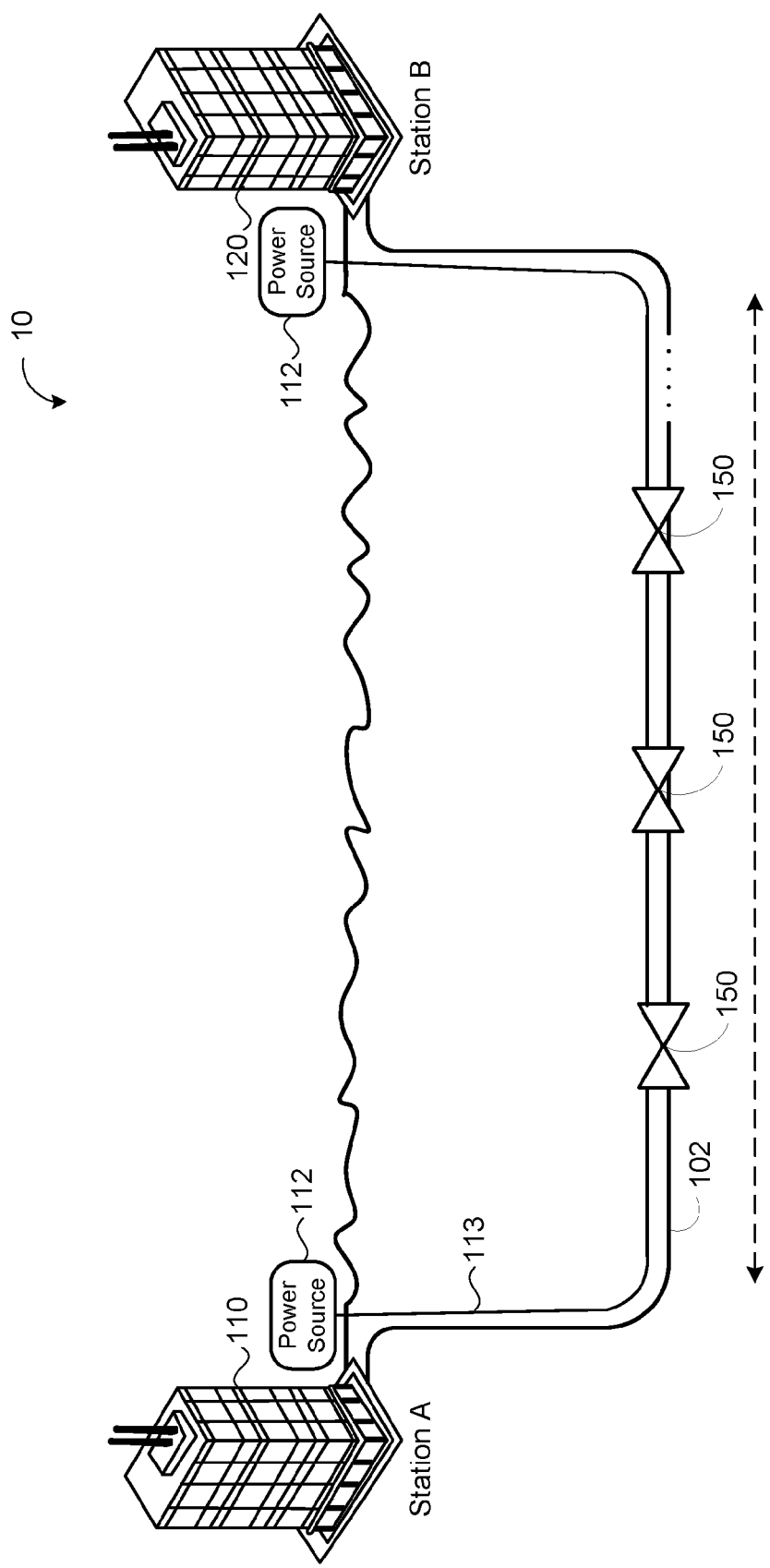
FIG. 1 is a prior art schematic view of an optical communication system having on shore power sources.

The repeater(s) 150 may include any optical amplifier configuration that compensates for signal attenuation on the transmission path. For example, one or more repeaters 150 may be configured as an optical amplifier, such as an erbium doped fiber amplifier (EDFA), a Raman amplifier, or a hybrid Raman/EDFA amplifier. Optical amplifiers are devices that amplify an optical signal directly without converting the signal to an electrical signal first. An optical amplifier may be considered a laser without an optical cavity. Doped fiber amplifiers (DFAs) are optical amplifiers that use a doped optical fiber (i.e., an optical fiber containing a dopant, which is a trance impurity element that is inserted into a substance (in very low concentration) to alter the substance's optical properties) as a gain medium to amplify the optical signal. The signal to be amplified and a pump laser are multiplexed into the doped fiber, and the signal is amplified through interaction with doping ions. EDFA is the most common example of DFAs, where the core of a silica fiber is doped with trivalent erbium ions and may be efficiently pumped with a laser at wavelengths of 980 nm or 1,480 nm and still exhibit gain in the 1,550 nm region. In a Raman amplifier, the signal is intensified by Raman amplification, which is based on the stimulated Raman scattering (SRS) phenomenon, when a lower frequency signal photon induces the inelastic scattering of a higher-frequency pump photon in an optical medium in the non-linear regime. This results in another signal photon being produced, with the extra energy between pump and signal frequencies passed to the vibrational states of the medium, allowing for optical amplification. Therefore, the Raman amplification produces nonlinear interaction between the signal and a pump laser within the optical fiber (unlike the EDFA). The main advantage of Raman amplification is its ability to provide distributed amplification within each fiber segment 102, which increases the length of the fiber segment 102 before the next amplifier 150. A system bandwidth may coincide with the usable bandwidth of the optical amplifiers within the system 100. Each repeater 150 is locally powered through a local power source 160 (instead of the on shore power source 112 as shown in FIG. 1), which eliminates the physical limitations shown and described with respect to FIG. 1. By adding a local power source 160 that powers each repeater 150, the optical communication system 100 increases the number of fiber pairs each cable trunk includes, for example, previously each cable trunk included 5-6 fiber pairs, which may be increased to 10 times to 100 times by adding the local power source 160. In some examples, the repeaters 150 are spaced out for redundancy so that if one repeater 150 fails, the system 100 does not fail. In addition, power sources 160 powering adjacent repeaters 150 to the failed repeater 150, may compensate for the failed repeater 150 by increasing the power supplied to the working adjacent repeaters 150. In another example, one or more repeaters 150 may be configured as an optical communication repeater (also known as optical-electrical-optical (OEO)) that is used to regenerate an optical signal by converting it to an electrical signal, processing the electrical signal and then reconverting the electrical signal to an optical signal and outputting (transmitting) the converted optical signal. The optical communication repeaters are used to extend the reach of optical communications links by overcoming loss due to attenuation of the optical fiber and distortion of optical signal.

The local power source 160 provides power to the repeater 150 through a power cable 104 connecting the power source 160 and the repeater 150. The local power source 160 may be a solar powered battery, or based on wave energy, or based on fossil fuel, or a combination of both. Other examples of power are possible as well.

Figure 3:
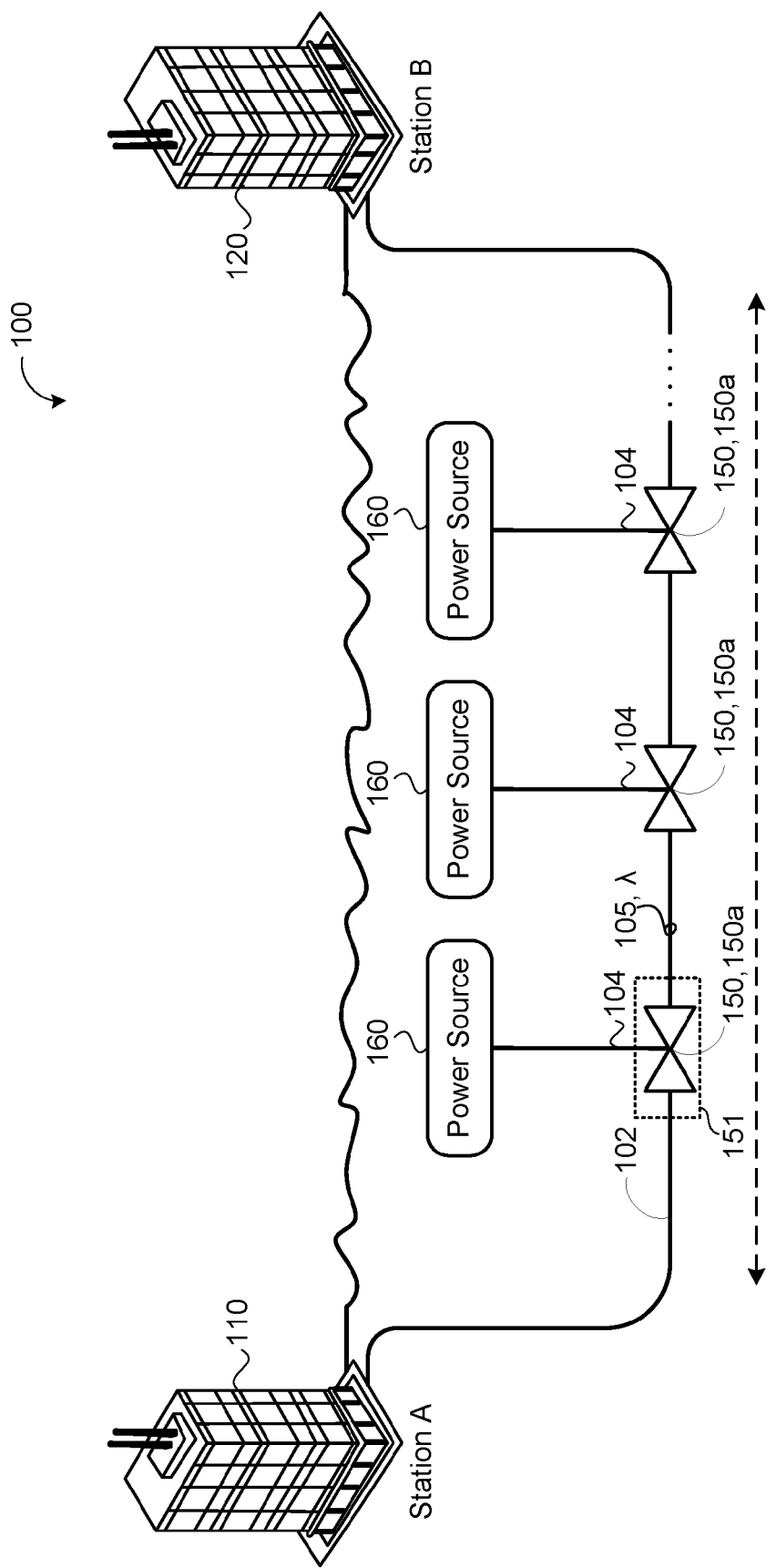

Referring to FIG. 3, in some implementations, the power source(s) 160 are located on or near the sea floor. Such power sources 160 may generate power based on wave motion, temperature gradients, or other suitable methods of power generation. Wave power is the transport of energy by ocean surface waves, and the capture of that energy to generate power to provide electricity, distill water, pump water, or any other uses. In some examples, the power source 160 is positioned between the ocean bed and the ocean surface, such that a boat may reach the power source 160 to maintain the power source 160.

Figure 4:
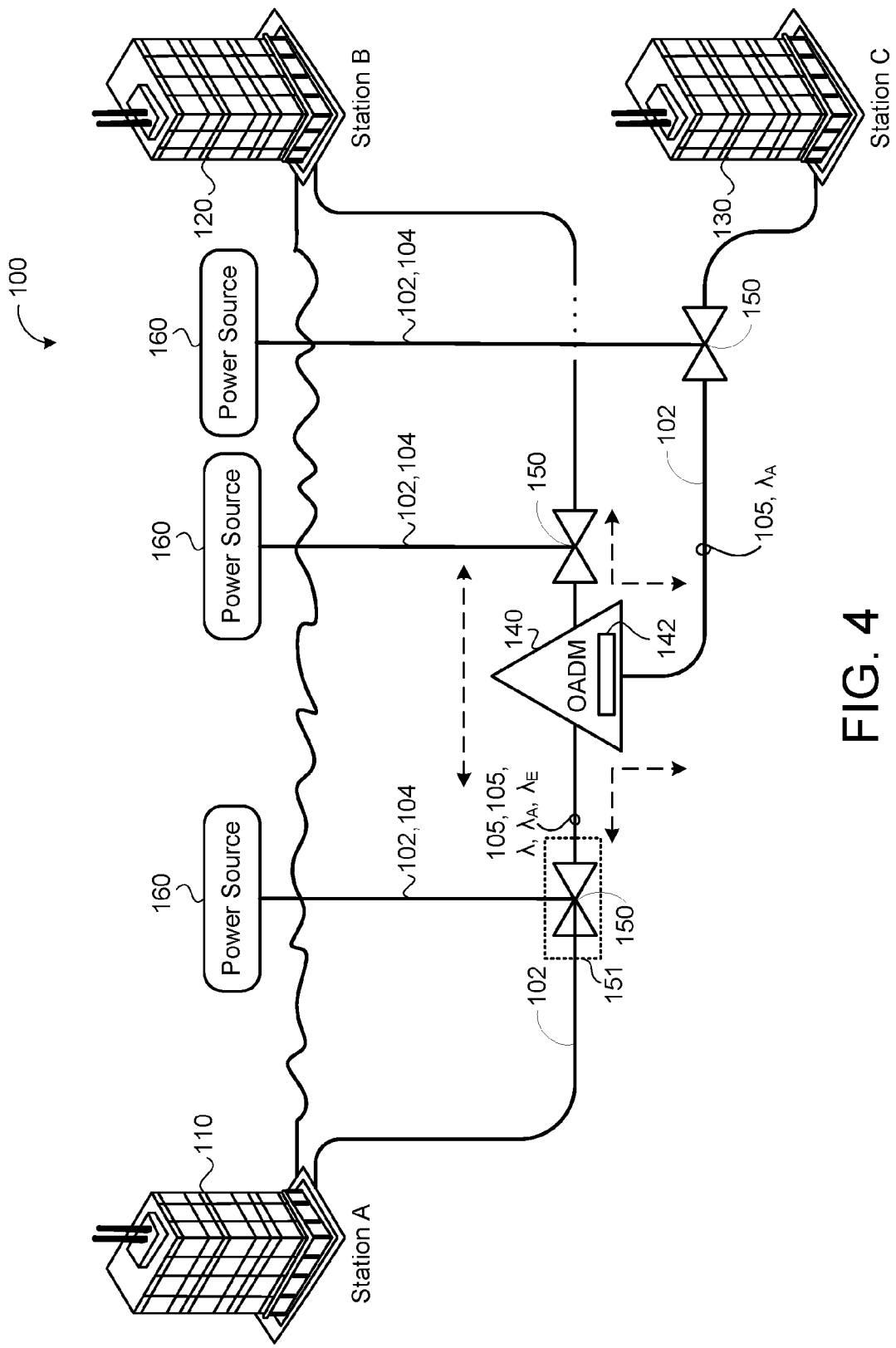
FIG. 4 is a schematic view of an exemplary optical communication system having power sources at or near the ocean surface along the communication trunk and having one or more branching units.

Referring to FIG. 4, in some implementations, one or more branch terminals 130 are coupled to the communication trunk 102 between the first and second trunk terminals 110, 120 by corresponding branching units 140. A branching unit 140 may be an OADM (optical add-drop multiplexers) branching unit. OADMs used in optical communication networks are capable of removing wavelength channels from multiple wavelength signals and adding channels to those signals. Moreover, one or more repeaters 150 and linking optical cables 102 may couple the branch terminal 130 to its corresponding branching unit 140. The system 100 may therefore be configured to provide bi-directional or uni-directional communication of optical signals 105 between terminals 110, 120, 130.

Branching units 140 enable the function of capacity redirection between express paths for express wavelengths $\lambda_E$ (e.g., from Station A to Station B) and add/drop paths (e.g., from Station A to Station C and/or Station B to Station C). This can be done, for example, by simultaneously adding/dropping a band of wavelengths $\lambda_A$ at each OADM 140. The terms "add/drop," "adding/dropping," and "added/dropped" refer to either the operation of adding one or more wavelengths $\lambda$, dropping one or more wavelengths $\lambda$, or adding wavelengths $\lambda$ and dropping others. Those terms are not intended to require both add and drop operations, but are also not intended to exclude add and drop operations. The terms are merely used as a convenient way to refer to either adding or dropping or both adding and dropping operations.

In general, the branching units 140 may add and drop channels $\lambda$ to/from the communication trunk 102. In some implementations, a wavelength division multiplexing (WDM) signal 105 originates at one or more of the terminals 110, 120, 130, and the branching units 140 may be configured either to pass some channels $\lambda$ through the branching units 140 to travel uninterruptedly through the communication trunk 102 from an originating trunk terminal 110, 120 to a receiving trunk terminal 110, 120 or other branching unit 140. The branching units 140 may add or drop one or more other channels $\lambda$ to/from the branch terminals 130. For example, a WDM signal 105 originating at the first trunk terminal 110 may include information occupying one or more channels $\lambda$. Likewise, a WDM signal 105 originating at the branch terminal 130 may occupy one or more channels $\lambda$. Both WDM signals 105 may be transmitted to the branching unit 140 that passes certain channels $\lambda$ therethrough from the originating first trunk terminal 110 along the communication trunk 102 without interruption to the second trunk terminal 120. The branching unit 140 may be configured to drop, i.e., extract information from, one or more channels $\lambda$ originating from the first trunk terminal 110 and pass the dropped channels $\lambda$ to the branch terminal 130. The branching unit 140 may also be configured to add, i.e., insert information on, certain channels $\lambda$ originating from the branch terminal 130 to the WDM signal 105 originating from the first trunk terminal 110 and pass the resulting WDM signal 105 (that includes the added information) onto the second trunk terminal 120. In some examples, the WDM signal 105 originating from the first trunk terminal 110 is fully terminated at the branching unit 140, in which case only the added information from the branch terminal 130 would be passed onto the second trunk terminal 120. Other branching units 140 may similarly pass through, add, and/or drop certain channels $\lambda$.

Any branching unit 140 may be disposed in an undersea environment and may be seated on the ocean floor. Additionally or alternatively, the branching unit 140 may be in a terrestrial environment and may be co-located at the same central office as the branch terminal 130. The communication trunk 102 may thus span between beach landings, or may provide a terrestrial connection between two terminal stations. The OADM 140 may include one or more tunable/adjustable filters 142 that provide a traffic mix of express wavelengths $\lambda_E$ and add/drop wavelengths $\lambda_A$ in the signal 105.

Multiple terminals/stations 110, 120, 130 share optical bandwidth of the same fiber pair by separating the whole spectrum into bands B using optical filters in the OADMs 140. A band B includes two or more wavelengths $\lambda$ (also referred to as channels) residing spectrally adjacent to one another. By adding/dropping one or more bands B of signal wavelengths $\lambda$ at each OADM 140, only signals 105 having wavelengths $\lambda$ adjacent to the spectral edges of the band are affected by asymmetry penalties and high loss. The term "spectral edge" refers to the wavelength $\lambda$ contained within a band of wavelengths $\lambda$ that is immediately adjacent to a wavelength $\lambda$ not included within that particular band B of wavelengths $\lambda$. None of the signals 105 having wavelengths $\lambda$ within the added/dropped band experience this spectral distortion.

In some implementations, the repeater 150 has a local power source 160 connected to the repeater 150. A type of connection to the repeater 150 may depend on the type of repeater 150. Referring to FIGS. 2-4, the repeater 150 is an active repeater 150a in need of power, the connected power supply 160 powers the repeater 150a though a power cable 104. However, referring to FIGS. 5-7, if the repeater 150 is a passive repeater 150p (a repeater 150p without any electronics to power the repeater 150p), the connected power supply 160 delivers power though a power cable 104 to a laser 170, which in turn delivers light to the passive repeater 150p through an optical fiber 102. The system 100 of FIGS. 5-7, separates the electronic layer, i.e., the power source 160 and the laser 170 from the optical layer, i.e., the passive repeater 150p. Therefore, in instances where the power source 160 or the laser 170 requires maintenance, they are positioned at a location where they can be easily reached. The laser 170 is a device that generates light though a process of optical amplification based on the stimulated emission of electromagnetic radiation. The laser 170 emits light coherently, which allows the laser 170 to be focused to a tight spot. For example, spatial coherence allows a laser beam (light) to stay narrow over long distances.

Figure 5:
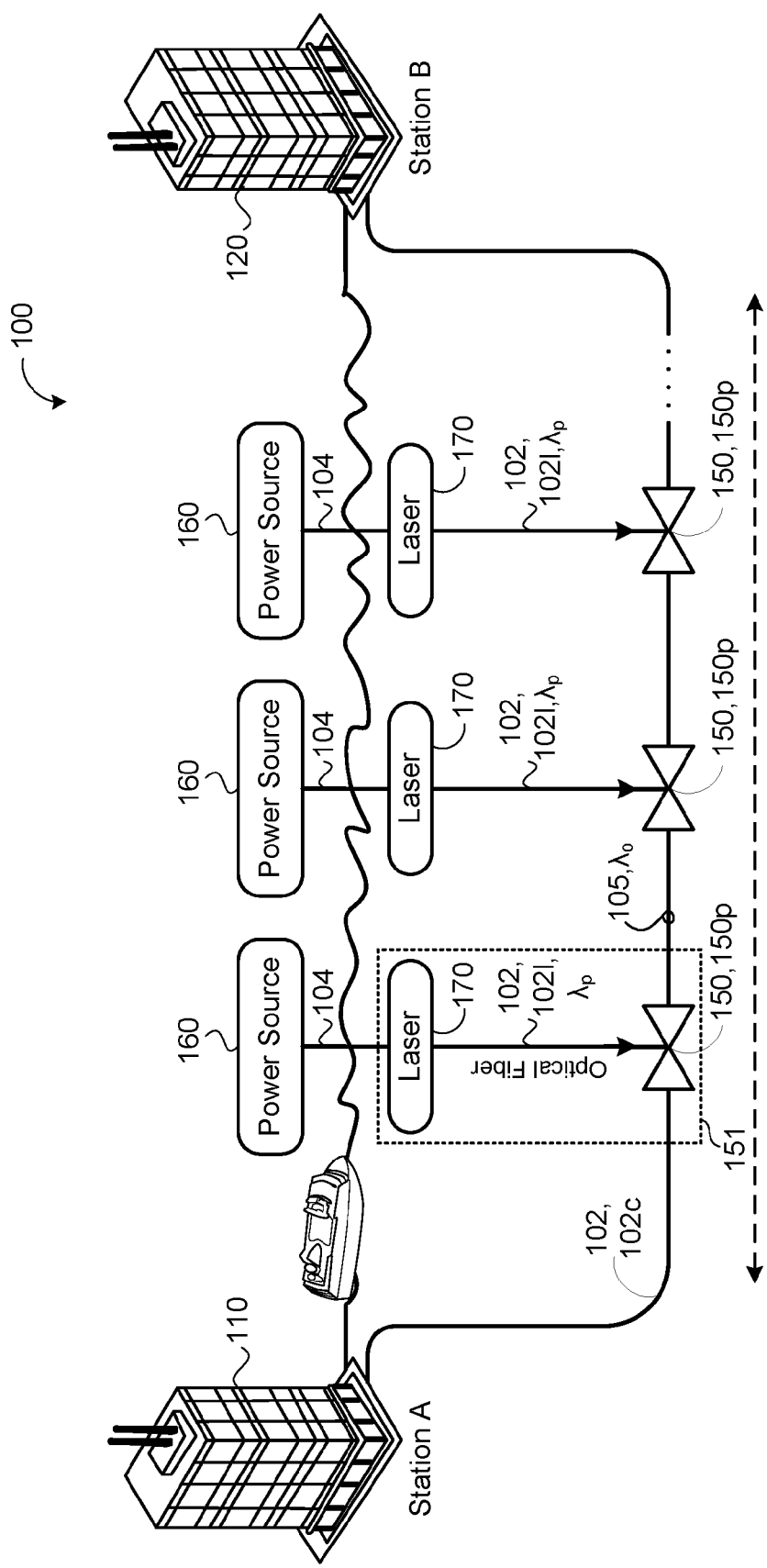
FIG. 5 is a schematic view of an exemplary optical communication system having power sources at or near the ocean surface along the communication trunk where the repeater is separated from the electrical portion.

Referring to FIG. 5, the optical communication system 100 includes first and second trunk terminals 110, 120 (also referred to as stations) coupled to the communication trunk 102c. The coupling may be any connection, link or the like by which signals carried by one system element are imparted to the "coupled" element. The coupled elements may not necessarily be directly connected to one another and may be separated by intermediate components or devices that may manipulate or modify the signals. The communication trunk 102 may include a plurality of optical cable segments 102, 102a-n (e.g., optical submarine cables) that carry optical signals 105 on associated optical channels/wavelengths $\lambda_o$.

Each cable segment 102 may include one or more sections of fiber optic cable including optical fiber pairs and one or more passive repeaters 150p to provide a transmission path for bi-directional communication of optical signals 105 between the first and second trunk terminals 110, 120. The system 100 may be configured as a long-haul system, e.g. having a length between at least two of the terminals 110, 120 of more than about 600 km, and may span a body of water, e.g., an ocean and having a length of 6,000-12,000 km.

The passive repeater(s) 150p may include any optical amplifier configuration that compensates for signal attenuation on the transmission path. For example, one or more repeaters 150 may be configured as an optical amplifier, such as an erbium doped fiber amplifier (EDFA), a Raman amplifier, or a hybrid Raman/EDFA amplifier. The passive repeater 150p combines the communication trunk 102c and the pump fiber 102p. The pump fiber 102p delivers a laser beam (having optical energy) to excite the doped optical fiber of the passive repeater 150p (e.g., to excite the erbium ions). The EDFA passive repeater 150p combined a relatively high-powered beam of light from the pump fiber 102p with an input signal from the communication trunk 102c using a wavelength selective coupler. The input communication signal of the communication trunk 102c and the high-powered beam of light of the pump fiber 102p must be at significantly different wavelengths. The pump fiber 102p output light having a wavelength within the absorption bandwidth of the Erbium ($Er^{3+}$ doped fiber) of the passive repeater 150p. The combined light (from the pump fiber 102p and the communication trunk 102c) is guided into a section of fiber within the passive repeater 150p with erbium ions included in the core of the fiber. This causes the high-powered beam of light from the pump fiber 102p to excite the erbium ions to their higher-energy state. When the photons of the communication signal of the communication trunk 102c at different wavelength from the high-powered beam of light of the pump fiber 102p meet the excited erbium atoms, the erbium atoms give up some of their energy to the communication signal of the communication trunk 102c and return to their lower-energy state. The erbium gives up its energy in the form of additional photons, which are in the same phase and direction as the signal being amplified, which is the communication signal from the communication trunk 102c. Therefore, the signal is amplified only in its direction of travel. Selection of a pump wavelength $\lambda_p$ of the pump fiber 102p is based on the erbium Er' absorption spectrum and the low loss of power of the fiber used to deliver the pump signal to the passive repeater 150p. In some example, the wavelength range of the pump wavelength $\lambda_p$ is within the 1400 nm and less than 1500 nm. By eliminating the power cable 113 from the power source 112 located on the shore (FIG. 1), the system 100 can increase the number of fibers in the communication trunk 102 to include 100 up to 1,000 fibers, and in some instances more. Therefore, each local power source 160 powers the 100 up to 1,000 fibers by supplying the laser 170 with a power of 1 kW (kilowatt) up to 10 kW.

Figure 6:
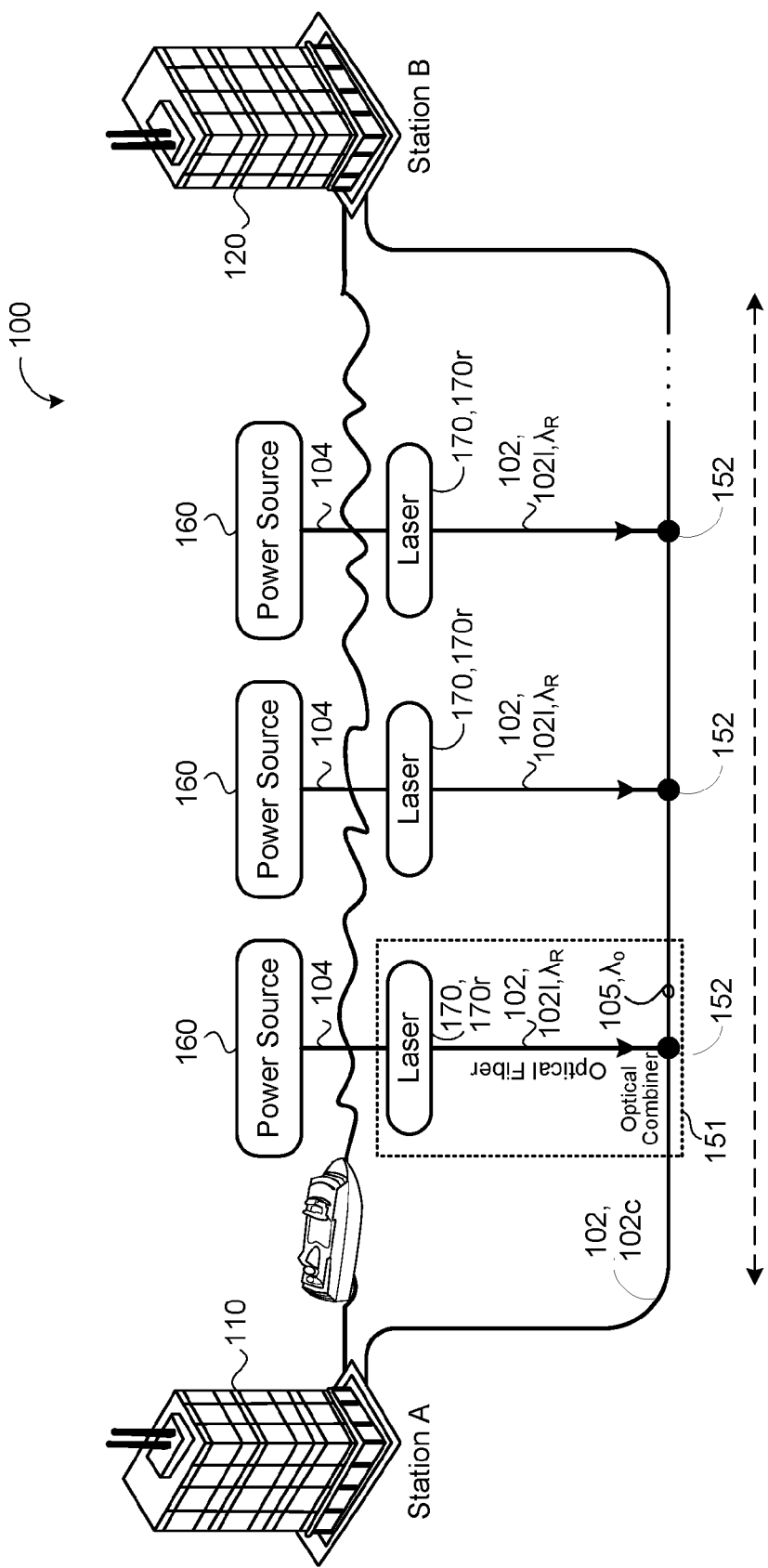
FIG. 6 is a schematic view of an exemplary optical communication system having power sources at or near the ocean surface along the communication trunk where the combiner/splitter is separated from the electrical portion.

FIG. 6 is similar to FIG. 5 except that the passive amplifier 150p is replaced with wavelength splitter 152. As shown, the splitter 152 enables Raman amplification in the transmission fiber by combining Raman pump light with wavelength lambdaP with signal light at wavelength lambda0. Splitter 152 is positioned at the sea bed and is in communication with the communication trunk 102c and the pump optical fiber 102l. The laser 170 may be a Raman laser 170r, which is a specific type of laser in which the fundamental light-amplification mechanism is simulated Raman scattering (this is different than conventional lasers, which rely on simulated electronic transitions to amplify light. Raman lasers 170r are optically pumped; however, the pumping does not produce a population inversion like conventional lasers. Instead, pump photons are absorbed and immediately re-emitted as lower-frequency laser light photons by simulated Raman scattering. The difference between the two photon energies is fixed and corresponds to a vibrational frequency of the gain medium. Thus, it is possible to produce arbitrary laser-output wavelengths by choosing pump-laser wavelength accordingly. (In conventional lasers, the possible laser output wavelengths are determined by the emission lines of the gain material.)

The Raman pump light having a Raman pump wavelength $\lambda_R$ is injected in the communication trunk 102c every 60 to 100 kilometers. The Raman pump wavelength $\lambda_R$ is shifted from the transmission wavelengths $\lambda_o$ by energy of molecular vibrations in glass. In this case, complete separation of the optical layer, i.e., the splitter 152 and the electrical layers, i.e., the power source 160 and the Raman laser 170r is achieved. The splitter 152, which is also a passive optical layer, has a long lifetime because no additional elements are mounted on the cable 102. Thus, the setup shown in FIG. 6 extends the lifetime of the cable 102 by more than 25 years because the splitter 152 comprises passive wavelength splitter. Moreover, in some examples, the Raman amplifier 152 when pumped by several Raman lasers 170r each having a different frequency may extend the amplifier bandwidth between two to three times compared to C-Band of 4 THz.

Referring back to FIGS. 2-6, the system 100 allows for simpler operation and maintenance of the equipment, since all active electronics, such as the local power sources 160 and the lasers 170 are located near the surface of the ocean. In addition, if the system 100 needs to be upgraded by adding more fiber pairs, then additional communication trunks 102, 102c are added without interfering with the existing communication trunks 102, 102c, and additional pump cables 102p are also added without interfering with the existing pump fiber (cable) 102p. Thus the existing cables 102 remain untouched during an upgrade to expand the system 100 bandwidth. Moreover, in this case, an additional laser 170 (not shown) is added to support the additional fibers 102.

Figure 7:
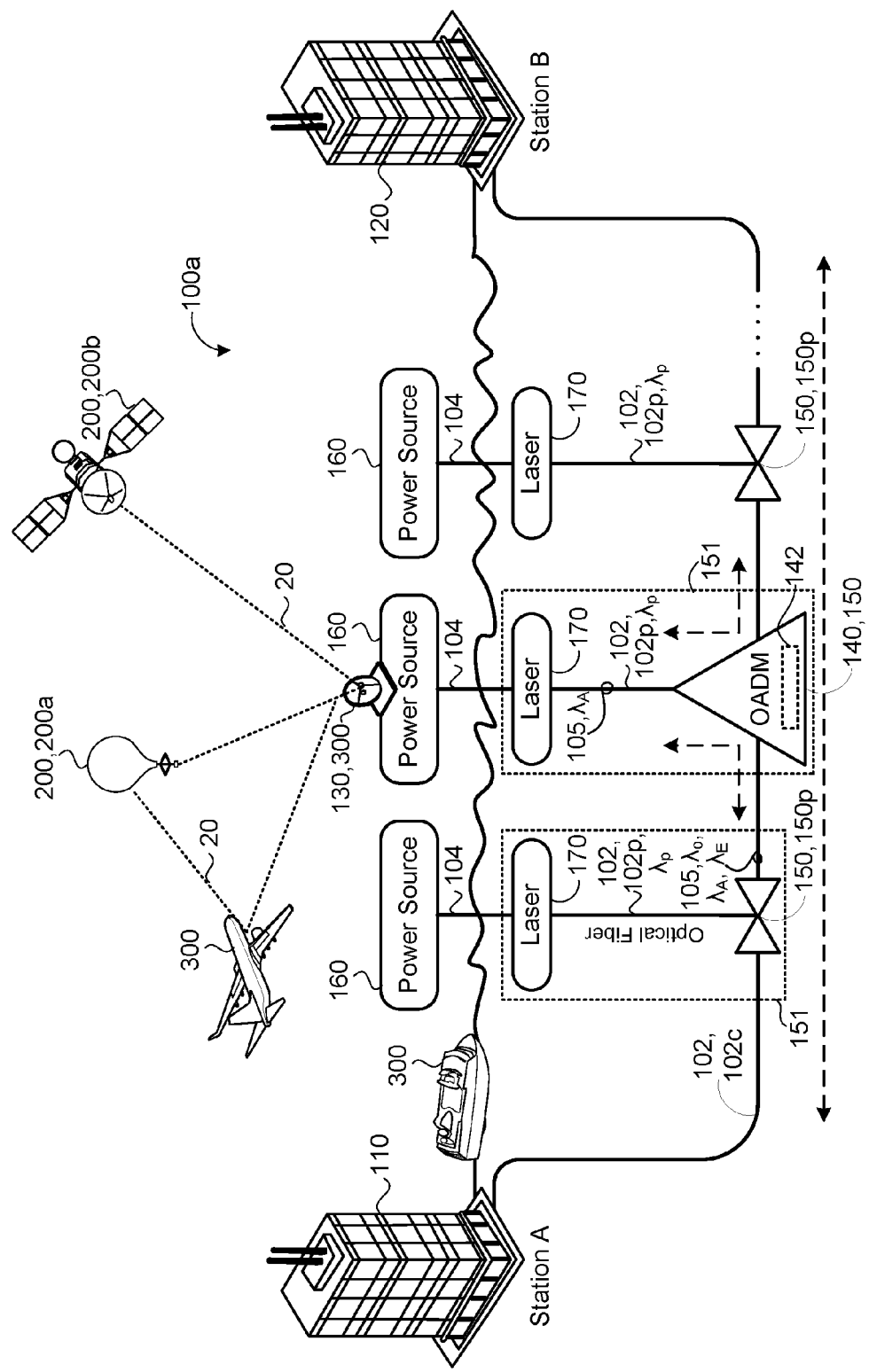
FIG. 7 is a schematic view of an exemplary optical communication system having power sources at or near the ocean surface along the communication trunk and having one or more branching units connecting to one or more High Altitude Communication Devices.
Figure 8B:
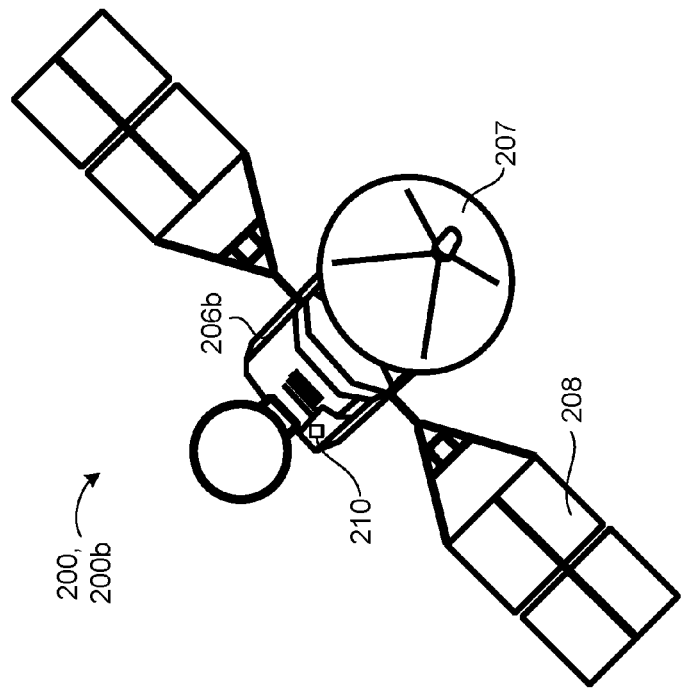
FIG. 8B is a perspective view of an exemplary satellite of the global-scale communication system that includes the optical communication system.

Referring to FIGS. 7-8B, in some implementations, a communication system 100a similar to the system previously described additionally includes High Altitude Communication Devices (HACD) 200 and gateways 300 (such as, a source ground station, a destination ground station, or linking ground stations). An HACD 200 is a device released into the earth's atmosphere. HACD 200 may refer to a communication balloon 200a or a satellite 200b in Low Earth Orbit (LEO) or Medium Earth Orbit (MEO) or High Earth Orbit (HEO), including Geosynchronous Earth Orbit (GEO). The HACD 200 includes an antenna 207 that receives a communication 20 from a source ground station 300 and reroutes the communication signal to a destination ground station 300. The HACD 200 also includes a data processing device 210 that processes the received communication 20 and determines a path of the communication 20 to arrive at the destination ground station 300. The system 100 may include communication balloons 200a, satellites 200b, or a combination of both.

As shown, one or more local power sources 160 may include a gateway 300 that provides communication with HACD device 200 and other gateways, providing redundant connections through HACDs 200 and communication trunks 102. The local power source 160 and the gateways 300 act as a POP (point of presence) in the sea to provide high bandwidth connection to HACDs 200 network.

In some implementations, one or more gateways 300 is a trunk terminal 130 communicating with the communication trunk 102c between the first and second trunk terminals 110, 120 by corresponding branching units 140, which also acts as repeaters. As previously described with respect to FIG. 4, a branching unit 140 may be an OADM (optical add-drop multiplexers) branching unit. OADMs used in optical communication networks are capable of removing wavelength channels from multiple wavelength signals and adding channels to those signals. Moreover, one or more repeaters 150 and linking optical cables 102 may couple the branch terminal 130 to its corresponding branching unit 140. The system 100 may therefore be configured to provide bi-directional or uni-directional communication of optical signals 105 between terminals 110, 120, 130.

Figure 8A:
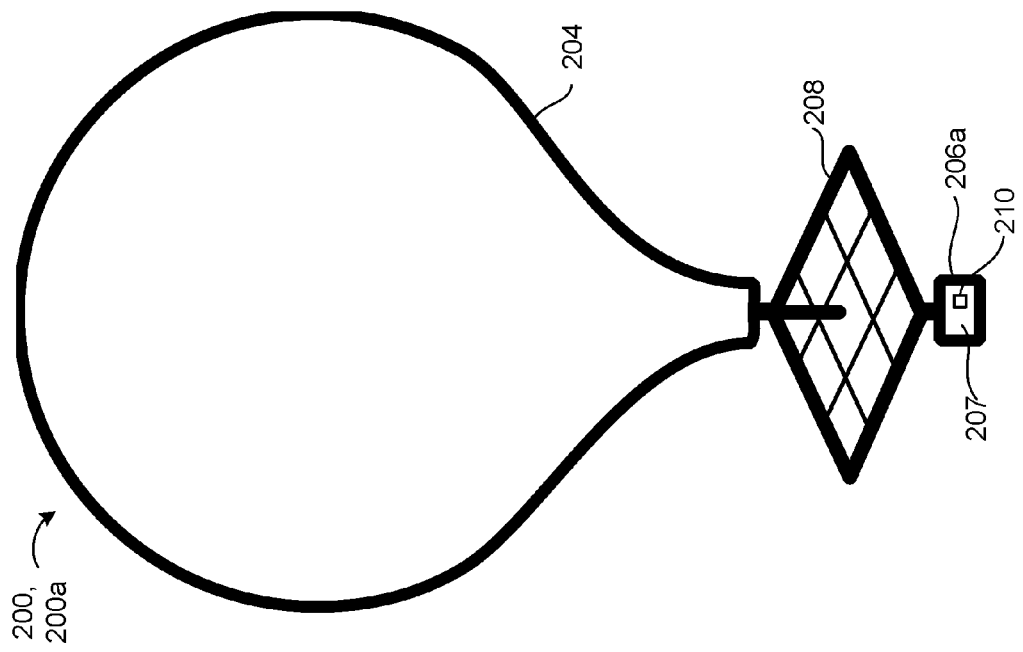
FIG. 8A is a perspective view of an exemplary communication balloon of the global-scale communication system that includes the optical communication system.

Referring to FIG. 8A, the communication balloons 200a include a balloon 204 (e.g., sized about 49 feet in width and 39 feet in height), an equipment box 206a, and solar panels 208. The equipment box 206a includes a data processing device 210 that executes algorithms to determine where the high-altitude balloon 200a needs to go, then each high-altitude balloon 200a moves into a layer of wind blowing in a direction that will take it where it should be going. The equipment box 206a also includes batteries to store power and a transceiver (e.g., antennas 207) to communicate with other balloons 200a, internet antennas on the ground or gateways 300. The communication balloons 200a also include solar panels 208 that power the equipment box 206a. In some examples, the solar panels 208 produce about 100 watts in full sun, which is enough to keep the communication balloons 200a running while charging the battery and is used during the night when there is no sunlight. When all the high-altitude balloons 200a are working together, they form a balloon constellation. In some implementations, users on the ground have specialized antennas that send communication signals to the communication balloon 200a eliminating the need to have a source or destination ground station 300. The communication balloon 200a receiving the communication 20 sends the communication 20 to another communication balloon 200a until one of the communication balloons 200a is within reach of a destination ground station 320 that connects to the local internet provider and provides service to the user via the network of balloons 200a.

A satellite 200b is an object placed into orbit around the earth and may serve different purposes, such as military or civilian observation satellites, communication satellites, navigations satellites, weather satellites, and research satellites. The orbit of the satellite 200b varies depending in part on the purpose the satellite 200b is being used for. Satellite orbits may be classified based on their altitude from the surface of the earth as Low Earth Orbit (LEO), Medium Earth Orbit (MEO), and High Earth Orbit (HEO). LEO is a geocentric orbit (i.e., orbiting around the earth) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

Multiple satellites 200b working in concert form a satellite constellation. The satellites 200b within the satellite constellation may be coordinated to operate together and overlap in ground coverage. Two common types of constellations are the polar constellation and the Walker constellation, both designed to provide maximum earth coverage while using a minimum number of satellites 200b.

Referring to FIG. 8B, a satellite 200b includes a satellite body 206b having a data processing device 210, similar to the data processing device 210 of the communication balloons 200a. The data processing device 210 executes algorithms to determine where the satellite 200b is heading. The satellite 200b also includes an antenna 207 for receiving and transmitting a communication 20. The satellite 200b includes solar panels 208 mounted on the satellite body 206b. The solar panels 208 provide power to the satellite 200b. In some examples, the satellite 200b includes rechargeable batteries used when sunlight is not reaching and charging the solar panels 208.

When constructing a system 100 from multiple HACDs 200, it is sometimes desirable to route traffic over long distances through the system 100 by linking one HACD 200 to another. For example, two satellites 200b may communicate via inter-satellite links and two balloons 200a may communicate via inter-balloon links. Such inter-device (satellite 200b or balloon 200a) linking IDL is useful to provide communication services to areas far from source and destination ground stations 300 and may also reduce latency and enhance security (fiber optic cables may be intercepted and data going through the cable may be retrieved). This type of inter-device communication is different than the "bent-pipe" model, in which all the signal traffic goes from a ground-base gateway 300 to a satellite 200b, and then directly down to a user on earth or vice versa. The "bent-pipe" model does not include any inter-device communications; instead, the satellite 200b acts as a repeater. In some examples of "bent-pipe" models, the signal received by the satellite 200b is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, long-scale HACD constellations (e.g., balloon constellation or satellite constellations) are described in terms of a number of planes or groups (not shown), and the number of HACDs 200 per plane. HACDs 200 within the same plane maintain the same position relative to their intra-plane HACD 200 neighbors. However, the position of an HACD 200 relative to neighbors in an adjacent plane varies over time.

Inter-device link (IDL) eliminates or reduces the number of HACDs 200 to gateway hops, which decreases the latency and increases the overall network capabilities. Inter-device links allow for communication traffic from one HACD 200 covering a particular region to be seamlessly handed over to another HACD 200 covering the same region, where a first HACD 200 is leaving the first area and a second HACD 200 is entering the area.

Figure 9:
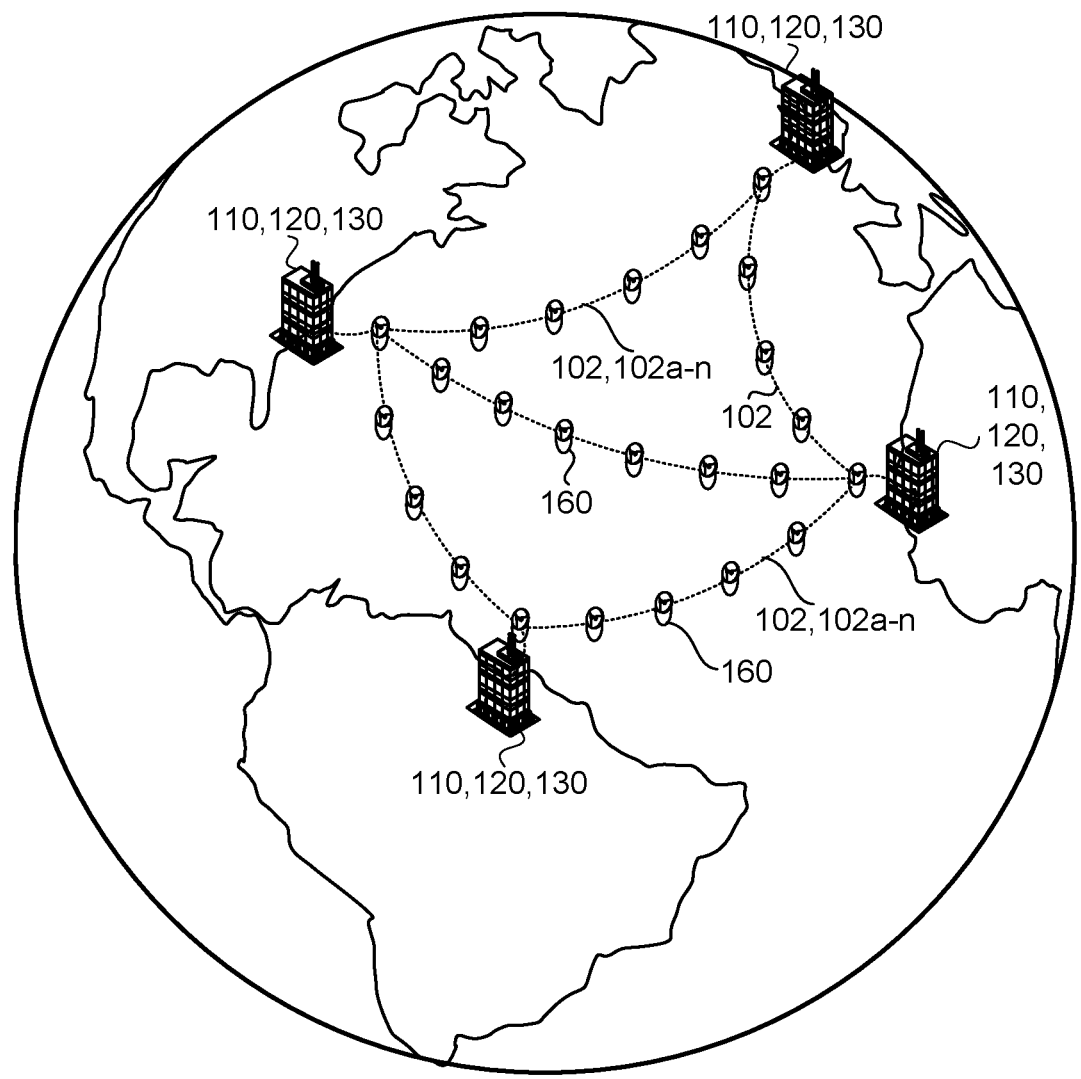
FIG. 9 is a schematic view of a network comprising one or more communication systems interconnected.

Referring to FIG. 9, in some implementations, multiple terminals/stations 110, 120, 130 are connected via one or more communication trunks 102. The communication trunk 102 may include a plurality of optical cable segments 102, 102a-n (e.g., optical submarine cables) that carry optical signals 105 on associated optical channels/wavelengths λ. In some examples, the multiple terminals/stations 110, 120, 130 are connected via HACDs 200 and gateways 300 (as described with respect to FIGS. 7 and 8). In some examples, one or more switches are places within the network redirect a communication when a portion of the network requires maintenance. Therefore, the communication is goes through a different path until maintenance is complete. The optical switch may be mounted at local power sources 160 or nearby for operational simplicity.

Figure 10:
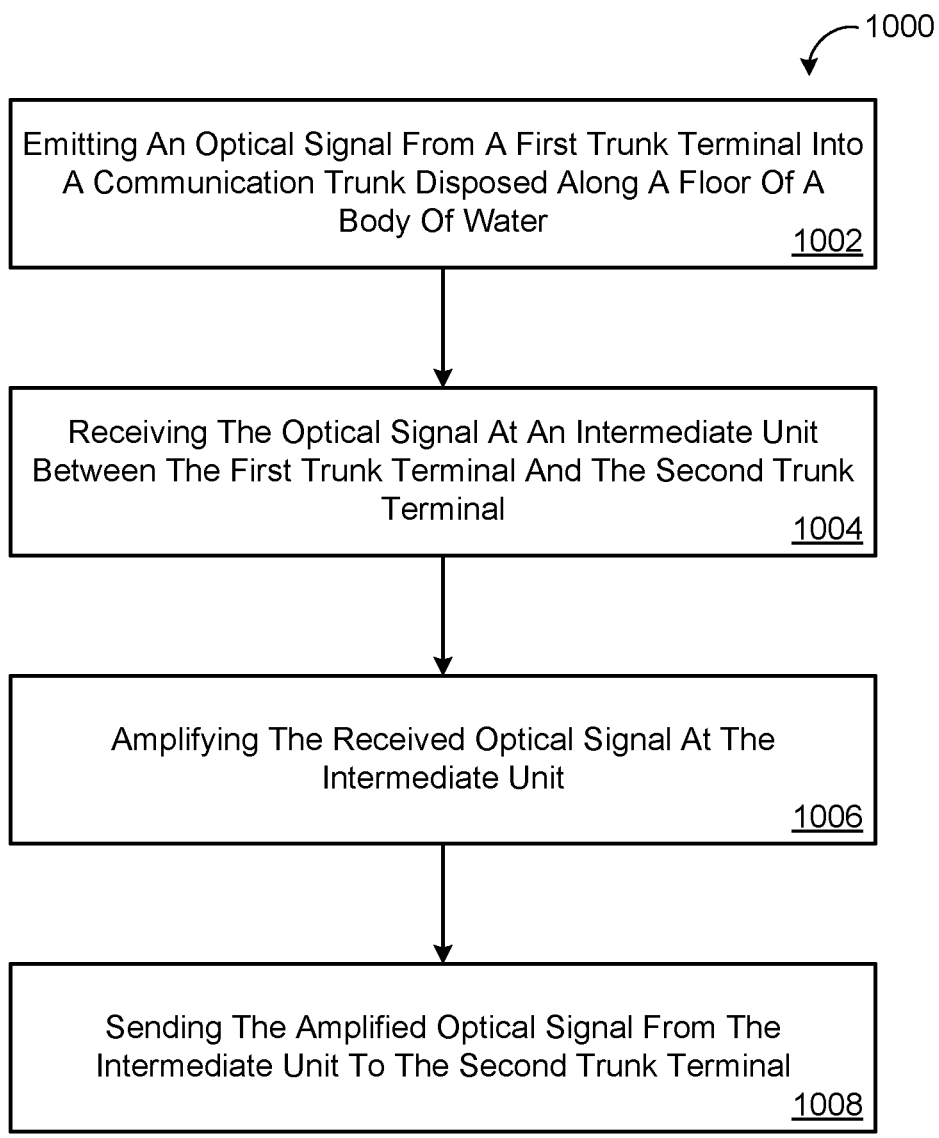
FIG. 10 is a schematic view of an exemplary arrangement of operations for a method of optical communication.

FIG. 10 is a schematic view of an exemplary arrangement of operations for a method 1000 of optical communication that includes at block 1002, emitting an optical signal 105 from a first trunk terminal 110 into a communication trunk 102, 102c disposed along a floor of a body of water. The communication trunk 102, 102c couples the first trunk terminal 110 to a second trunk terminal 120 and transmits the optical signal 105 (having a wavelength λ) from the first trunk terminal 110 to the second trunk terminal 120. At block 1004, the method 1000 further includes receiving the optical signal 105 at an intermediate unit 151 between the first trunk terminal 110 and the second trunk terminal 120. The intermediate unit 151 is connected to the communication trunk 102 between the first and second trunk terminals 110, 120. The intermediate unit 151 is powered by a power source 160 located at or near a surface of the body of water for easy access to the power source when the power source 170 requires maintenance. At block 1006, the method 1000 further includes amplifying the received optical signal 105, received from the communication trunk 102c at the intermediate unit 151 and at block 1008, sending the amplified optical signal 105 from the intermediate unit 151 to the second trunk terminal 120.

In some implementations, amplifying the received optical signal 105 received from the communication trunk 102c includes combining an optical output 105 from a laser 170 via the pump fiber 102p of the intermediate unit 151 with the received optical signal 105. The method 1000 may further include, at the intermediate unit 151 (e.g., using an optical communication repeater), converting the received optical signal 105 to an electrical signal, processing the electrical signal and converting the electrical signal to the amplified optical signal 105. In some examples, the intermediate unit may include a laser 170 powered by the power source 160 and emitting an optical output 105 through a power pump 102p, and an optical combiner 150 in communication with the laser 170 and the first and second trunk terminals 110, 120. The optical combiner 150 may include receiving the optical signal 105 from the first trunk terminal 110 and the optical output 105 from the laser 170, amplifying the optical signal 105 by combining the optical signal 105 from the first trunk terminal 110 and the optical output 105 from the laser 170 and outputting the amplified signal 105 to the second trunk terminal 120. The power source 160 may include one of a wave power source, a solar power source, a thermoelectric power source, or a fuel power source.

In some examples, the method 1000 includes filtering, at a branching unit 140 in communication with the intermediate unit 151, a first band of wavelengths $\lambda_E$ of a communication spectrum for a first communication segment and filtering, at the branching unit 140, a second band of wavelengths $\lambda_A$ of the communication spectrum for a second communication segment. The second band of wavelengths overlap the first band of wavelengths $\lambda_E$ in an overlap band of wavelengths with no guard band between the first band $\lambda_E$ and the second band $\lambda_A$. The overlap band has a variable size. The first band $\lambda_E$ of wavelengths may include a first fraction of the overlap band of wavelengths for the first communication segment and the second band of wavelengths $\lambda_A$ includes a remaining fraction of the overlap band of wavelengths for the second communication segment. The overlap band of wavelengths may include common wavelengths between a spectral edge of the first band of wavelengths and a spectral edge of the second band of wavelengths.

Figure 11:
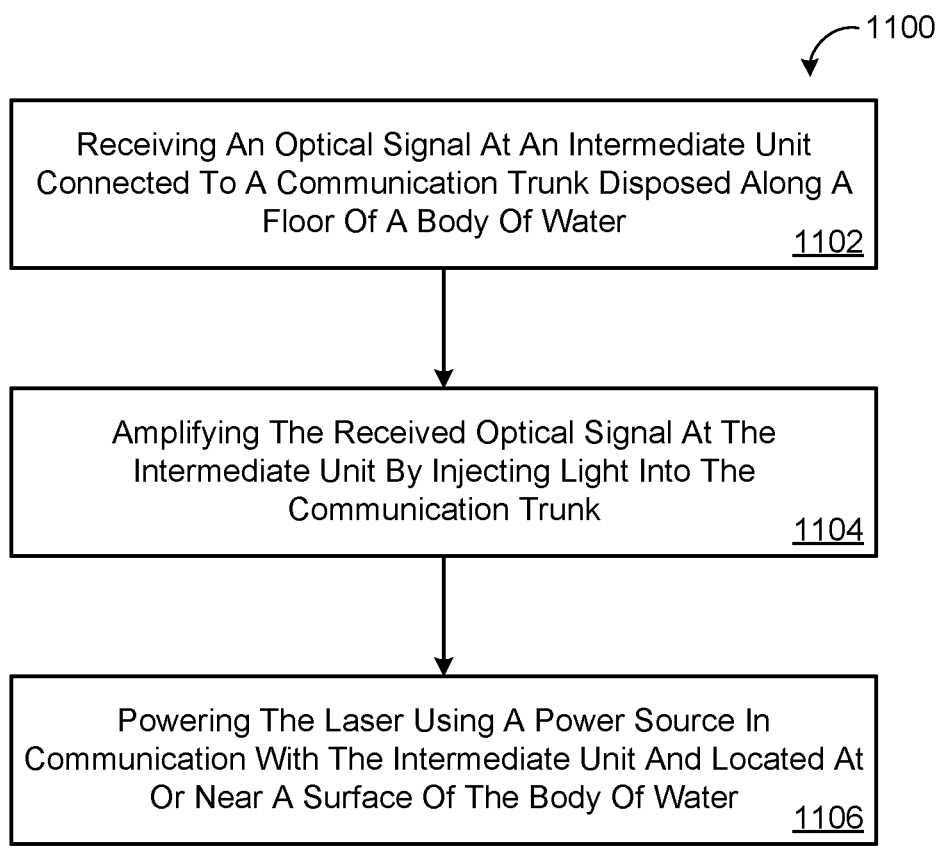
FIG. 11 is a schematic view of an exemplary arrangement of operations for a method of optical communication.

FIG. 11 is a schematic view of an exemplary arrangement of operations for a method 1100 of optical communication that includes, at block 1102, receiving an optical signal 105 at an intermediate unit 151 connected to a communication trunk 102c disposed along a floor of a body of water, the intermediate unit 151 coupling a first trunk terminal 110 to a second trunk terminal 120. At block 1104, the method 1100 further includes amplifying the received optical signal 105 at the intermediate unit 151 by injecting light (e.g., optical signal from a laser 170) into the communication trunk 102c. The intermediate unit 151 includes an optical combiner 150 connected to the communication trunk 102c and a laser 170 in optical communication with the optical combiner 150 and sends an optical output 105 to the optical combiner 150. At block 1106, the method 1100 further includes powering the laser 170 using a power source 160 in communication with the intermediate unit 151 and is located at or near a surface of the body of water.

In some examples, amplifying the received optical signal 105 from the communication trunk 102c includes combining an optical output 105 from the laser 170 of the intermediate unit 151 with the received optical signal 105 from the communication trunk 102c. The laser 170 may be located at or near the power source 160 or at or near the optical combiner. The power source 160 may include a wave power source, a solar power source, a thermoelectric power source, or a fuel power source.

In some implementations, the method 1100 includes filtering, at a branching unit 140 in communication with the intermediate unit 151, a first band of wavelengths $\lambda_E$ of a communication spectrum for a first communication segment and filtering, at the branching unit 140, a second band of wavelengths $\lambda_A$ of the communication spectrum for a second communication segment. The second band of wavelengths $\lambda_A$ overlap the first band of wavelengths $\lambda_E$ in an overlap band of wavelengths with no guard band between the first band $\lambda_E$ and the second band $\lambda_A$, the overlap band having a variable size. The first band of wavelengths $\lambda_E$ includes a first fraction of the overlap band of wavelengths for the first communication segment and the second band of wavelengths includes a remaining fraction of the overlap band of wavelengths for the second communication segment. The overlap band of wavelengths includes common wavelengths between a spectral edge of the first band of wavelengths and a spectral edge of the second band of wavelengths. The optical combiner may include a Raman Amplifier or a high power Erbium Doped Fiber Amplifier.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the disclosure. For example, while the concepts disclosed herein are illustrated for submarine networks where the Branching Unit with OADM is not easily accessible and replaceable, this disclosure is applicable to non-subsea (i.e., terrestrial) networks as well. Moreover, the concept of flexible add/drop by using an overlap band Bo is extensible to dimensions other than spectrum sharing. Any other dimensions that have inherent orthogonality can be used for the flexible add/drop using an overlap band Bo, such as time division multiplexing, space division multiplexing using multi core fibers or many mode fibers, polarization division multiplexing. Accordingly, other implementations are within the scope of the following claims.

What is claimed is:

1. A branching unit for an optical system having a communication trunk and a branch terminal, the branching unit configured to couple the branch terminal to the communication trunk, the branching unit comprising an optical add-drop multiplexer comprising:
   a first filter configured to filter a first band of wavelengths of a communication spectrum for a first communication segment of an optical signal; and
   a second filter configured to filter a second band of wavelengths of the communication spectrum for a second communication segment of the optical signal, the second band of wavelengths overlapping the first band of wavelengths in an overlap band of wavelengths with no guard band between the first band of wavelengths and the second band of wavelengths, the overlap band of wavelengths having a variable size,
   wherein the first band of wavelengths includes a first fraction of the overlap band of wavelengths for the first communication segment and the second band of wavelengths includes a remaining fraction of the overlap band of wavelengths for the second communication segment.

2. The branching unit of claim 1, wherein the first band of wavelengths includes an entire overlap band of wavelengths for the first communication segment and the second band of wavelengths excludes the overlap band of wavelengths from the second communication segment.

3. The branching unit of claim 1, wherein the overlap band of wavelengths comprises common wavelengths between a spectral edge of the first band of wavelengths and a spectral edge of the second band of wavelengths.

4. The branching unit of claim 1, wherein the first filter and/or the second filter provide a fixed sized overlap band of wavelengths of the communication spectrum.

5. The branching unit of claim 1, wherein the first filter and/or the second filter are adjustable to provide a variable sized overlap band of wavelengths of the communication spectrum.

6. The branching unit of claim 1, wherein filtering comprises adding, dropping, and/or reusing wavelengths.

7. The branching unit of claim 1, further comprising an amplifier optically coupled to the optical add-drop multiplexer and configured to amplify the optical signal.

8. The branching unit of claim 7, further comprising a power source electrically coupled to the amplifier, the optical add-drop multiplexer located at or near a floor of a body of water, the power source located at or near a surface of the body of water.

9. The branching unit of claim 8, further comprising a communication gateway optically coupled to the optical add-drop multiplexer and located at the surface of the body of water.

10. A method comprising:
   receiving, at an optical branching unit, an optical signal;
   filtering, at a first filter of the branching unit, a first band of wavelengths of a communication spectrum for a first communication segment of the optical signal; and
   filtering, at a second filter of the branching unit, a second band of wavelengths of the communication spectrum for a second communication segment of the optical signal, the second band of wavelengths overlapping the first band of wavelengths in an overlap band of wavelengths with no guard band between the first band of wavelengths and the second band of wavelengths, the overlap band of wavelengths having a variable size,
   wherein the first band of wavelengths includes a first fraction of the overlap band of wavelengths for the first communication segment and the second band of wavelengths includes a remaining fraction of the overlap band of wavelengths for the second communication segment.

11. The method of claim 10, wherein the first band of wavelengths includes an entire overlap band of wavelengths for the first communication segment and the second band of wavelengths excludes the overlap band of wavelengths from the second communication segment.

12. The method of claim 10, wherein the overlap band of wavelengths comprises common wavelengths between a spectral edge of the first band of wavelengths and a spectral edge of the second band of wavelengths.

13. The method of claim 10, wherein the first filter and/or the second filter provides a fixed sized overlap band of wavelengths of the communication spectrum.

14. The method of claim 10, further comprising adjusting, by the first filter and/or the second filter, a size of the overlap band of wavelengths of the communication spectrum.

15. The method of claim 10, wherein filtering comprises adding, dropping, and/or reusing wavelengths.

16. The method of claim 10, further comprising transmitting the first or second band of wavelengths of the optical signal from a communication gateway optically coupled to the branching unit to a high altitude communication device.

17. The method of claim 10, further comprising amplifying, by an amplifier of the branching unit, the received optical signal.

18. The method of claim 17, further comprising powering the amplifier by a power source located at or near a surface of a body of water, the branching unit disposed in the body of water.

19. The method of claim 18, wherein the amplifier is located at or near the surface of the body of water and the first and second filters are located at or near a floor of the body of water.

20. The method of claim 18, wherein the power source comprises one of a wave power source, a solar power source, a thermoelectric power source, or a fuel power source.

* * * * *